(12) United States Patent
Woods

(10) Patent No.: US 6,651,085 B1
(45) Date of Patent: Nov. 18, 2003

(54) AGENT STATUS VIEWING SYSTEM AND METHOD

(75) Inventor: Paul R. Woods, Fishers, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 651 days.

(21) Appl. No.: 09/617,331

(22) Filed: Jul. 17, 2000

(51) Int. Cl.[7] .............................................. G06F 13/00
(52) U.S. Cl. ...................................................... 709/203
(58) Field of Search ................................ 709/200, 203, 709/223, 224

(56) References Cited

U.S. PATENT DOCUMENTS

| | | | |
|---|---|---|---|
| 5,313,517 A | 5/1994 | Inaguma ...................... 379/67 |
| 5,544,237 A | 8/1996 | Bales et al. .................. 379/205 |
| 5,884,032 A | 3/1999 | Bateman et al. ........ 395/200.34 |
| 5,920,621 A | 7/1999 | Gottlieb ....................... 379/265 |
| 5,999,965 A | 12/1999 | Kelly .......................... 709/202 |
| 6,009,469 A | 12/1999 | Mattaway et al. .......... 709/227 |
| 6,035,031 A | 3/2000 | Silverman ................... 379/209 |
| 6,046,762 A | 4/2000 | Sonesh et al. ................. 348/16 |
| 6,130,933 A | 10/2000 | Miloslavsky ............. 379/90.01 |
| 6,259,774 B1 | 7/2001 | Miloslavsky ............. 379/90.01 |
| 6,272,216 B1 | 8/2001 | Vaios .......................... 379/265 |

OTHER PUBLICATIONS

Interactive Intelligence, "Interact!", Brochure, Indianapolis, IN. (Dated 1998).
CosmoCom, "CosmoCall CosmoCom", Internet Brochure found at URL www.cosmocom.com, Melville, NY., (Dated at least as early as Apr. 18, 2000).

*Primary Examiner*—Robert B. Harrell
(74) *Attorney, Agent, or Firm*—Woodard, Emhardt, Moriarty McNett & Henry LLP

(57) ABSTRACT

A system for notifying and updating status of selected customer agent includes a customer computer, a computer network, and a customer contact processing computer. The customer contact processing computer is coupled to the customer computer by the computer network. The customer contact processing computer includes a storage unit to store a status indication for each agent. The customer contact processing computer is responsive to an input from the customer computer over the computer network, which corresponds to a selection of at least one of the agents by a customer computer. The customer contact processing computer transmits over the computer network the status indication for the selected agents from the storage unit to the customer computer. The customer contact processing computer updates the status indication transmitted to the customer computer for the agents from time to time.

29 Claims, 6 Drawing Sheets

New User Login

Name: Last [ ] First [ ]

Title: [ ] Company: [ ]

Telephone: [ ] Fax: [ ]

email: [ ]

account name: [ ] Password: [ ]

Fig. 2

Agent Status Search

First Name: [ ]

Last Name: [ ]

Department: [ ▼]

Location: [ ▼]

[ Submit ]

Fig. 3

| | | | |
|---|---|---|---|
| Doe, John | | | |
| 📞 | Available  WebCamp<br>Voice/Fax: 111-123-4567 | johnd@email.addr | Callback Chat VON |
| Doe, Kevin | | | |
| 🚫📞 | Not Available  WebCamp<br>Voice/Fax: 111-123-4567 | kevind@email.addr | Callback Chat VON |
| Doe, Lana | | | |
| 🍔 | Out To Lunch  WebCamp<br>Voice/Fax: 111-123-4567 | lanad@email.addr | Callback Chat VON |
| Doe, Mark | | | |
| 🚗 | Out-Of-Office  WebCamp<br>Voice/Fax: 111-123-4567 | markd@email.addr | Callback Chat VON |
| Doe, Nina | | | |
| 👥 | In A Meeting  WebCamp<br>Voice/Fax: 111-123-4567 | ninad@email.addr | Callback Chat VON |
| Doe, Orin | | | |
| 🏗️ | In Training  WebCamp<br>Voice/Fax: 111-123-4567 | orind@email.addr | Callback Chat VON |
| Doe, Paul | | | |
| 🎾 | On Vacation  WebCamp<br>Voice/Fax: 111-123-4567 | pauld@email.addr | Callback Chat VON |
| Doe, Quincy | | | |
| 🏠 | At Home  WebCamp<br>Voice/Fax: 111-123-4567 | quincyd@email.addr | Callback Chat VON |
| Doe, Rhonda | | | |
| 📞 | On The Phone  WebCamp<br>Voice/Fax: 111-123-4567 | rhondad@email.addr | Callback Chat VON |

Fig. 4

AGENT STATUS VIEWING SYSTEM AND METHOD

BACKGROUND OF THE INVENTION

The present invention relates to automatic communication systems, and more specifically, but not exclusively, relates to the communication of agent status at a customer contact processing center.

Automatic call distribution (ACD) systems are used in a wide variety of situations such as for telemarketing, customer service and sales. In one common arrangement, calling customers are placed in a queue by the ACD to await the next available agent. This delay can frustrate a customer. This frustration can be heightened by the customer not knowing when they will be able to talk to an agent. Also, if the customer is able to select a specific customer agent, the customer can become frustrated when the selected agent is unavailable because the customer does not know whether the agent is on another line, away from the phone, on vacation, at lunch, or not able to answer the call for other reasons. By not having enough information about the status of the agent, a customer's ability to decide whether to contact a different agent, leave a voice message, or try to call the agent later can be hampered. This lack of knowledge on the part of the customer leads to frustration, and creates a general negative impression of the organization. This customer dissatisfaction in the long term may lead to reduced sales for an organization. Therefore, there has been a long felt need to supply customers with information about their phone calls.

Attempts have been made to provide customers with additional information such as wait time for the next available agent. For example, U.S. Pat. No. 5,884,032 to Bateman et al. and U.S. Pat. No. 6,046,762 to Sonesh et al., both disclose communication systems in which a customer is supplied the wait time for a particular group of agents. However, in both systems a customer must place a call to receive a wait time. These systems do give the customer the ability to decide when to call the processing center. If an agent in a queue is available, the customer will be automatically connected to the agent. The customer may not want to talk with the agent at that time, and may merely want to know whether a particular agent is on vacation. In addition, such systems do not give the customer the ability to track specific agents or a group of specific agents (such as a marketing group).

Thus, there remains a need for improved techniques to obtain and update the status of one or more persons with whom it is desired to establish communications.

SUMMARY OF THE INVENTION

One form of the present invention is a unique communication system. Other forms include unique apparatus and methods for communicating information over a computer network. Another form of the present invention includes operating a first computer configured to store a status indication for each of a number of different agents at a customer contact processing center. The first computer is coupled to a second computer by a computer network. The second computer is remotely located relative to the first computer at a customer site. A customer at the customer site makes a selection of at least one of the agents. The method further includes receiving from the second computer an input corresponding to the selection. Furthermore, the method includes providing the status indication for the at least one of the agents from the first computer to the second computer, and updating the status indication provided to the second computer for the at least one of the agents from time to time in response to the receipt of the selection. This update can be automatically performed.

Another form of the present invention includes a means for storing the status indication for each of a number of different agents at a customer contact processing center. This form further includes a means for receiving across a computer network an input corresponding to a selection of at least one of the agents by a customer from a computer remotely located at a customer site. Also included is a means for providing the status indication for at least one of the agents from the means for storing to the computer located at the customer site, and a means for updating the status indication provided to the second computer for the at least one of the agents from time to time.

In yet another form, a computer readable device is encoded with a program executable by a first computer for a customer contact processing center which communicates over a computer network to maintain a status indication for each of a number of different agents at a customer contact processing center and to receive over the computer network an input corresponding to a selection of at least one of the agents by a customer on a second computer located at a remote customer site. The program is further executable by the first computer to provide the status indication to the second computer in response to the selection, and update the status indication provided to the second computer for the at least one of the agents from time to time.

In still yet another form, the present invention includes a customer computer, a computer network, and a customer contact processing computer. The customer contact processing computer is coupled to the customer computer by the computer network. The customer contact processing computer includes a storage unit to store a status indication for each of the agents. The customer contact processing computer is responsive to an input from the customer computer over the computer network corresponding to a selection of at least one of the agents by a customer operating the customer computer. The customer contact processing computer transmits over the computer network the status indication from the storage unit to the customer computer. The customer contact processing computer updates the status indication transmitted to the customer computer from time to time.

Further objects, features, advantages, and aspects of the present invention shall become apparent from the detailed drawings and descriptions contained herein.

BRIEF DESCRIPTION OF THE DRAWINGS

FIG. 2 shows a view of a new user login display screen form for the system of FIG. 1;

FIG. 3 shows a search agent status display screen form for the system of FIG. 1;

FIG. 4 shows an agent status display for the system of FIG. 1;

DESCRIPTION OF SELECTED EMBODIMENTS

Figure 1:
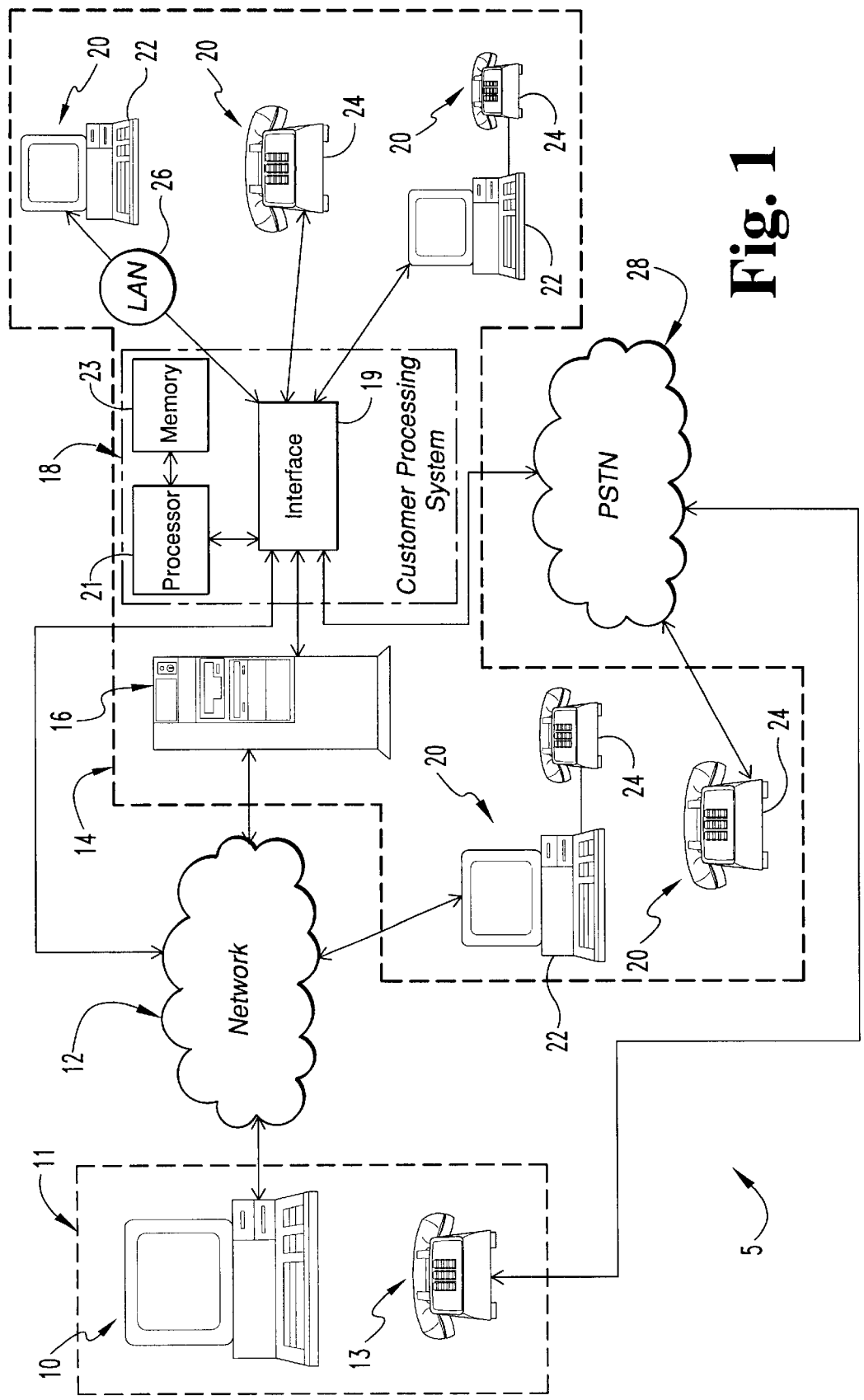
FIG. 1 is a diagrammatic view of a communication system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

In one embodiment of the present invention, a customer can initially select a person with whom communication might be desired, and request status information about that person over a computer network. This information can relate to the person's location, availability, or activities, to name just a few examples. After information is initially provided to the customer's computer in response to the request, it is automatically updated from time to time without requiring further input by the customer. Accordingly, the customer can view other information available over the network while receiving the updates. In one application, this embodiment can be utilized to assist the customer in selecting an appropriate time and mode of communicating with the person. For an arrangement where the computer network includes the internet, the customer can browse web pages available over the world wide web while continuing to automatically receive the status information updates.

FIG. 1 depicts communication system 5 in a diagrammatic form. System 5 includes customer computer 10 located at a customer site 11. Computer 10 is operatively connected to computer network 12. The customer computer 10 can include a personal computer, a computer terminal, a personal digital assistant (PDA), and/or other types of devices generally know to those skilled in the art. The customer computer 10 has software, which allows the customer computer 10 to transmit and receive information from the network 12. The software on the customer computer 10 can include a web browser and other types of client software generally known to those skilled in the art. In one embodiment, the customer computer 10 is a personal computer that has a web browser. Web browsers are widely available and do not require the customer to load additional software in order to obtain the benefits of the present invention. The network 12 can include the internet or other Wide Area Network (WAN), a local area network (LAN), a proprietary network such as provided by America OnLine, Inc., a combination of these, and/or other types of networks generally known to those skilled in the art.

A customer contact processing center 14 is connected to the network 12 through a server 16. The server 16 can be a web server as generally known to those skilled in the art. The customer contact processing center 14 further includes a customer processing system 18, and a number of agent stations 20. The customer processing system includes an interface 19 for communicating with other components, a processor 21 for processing information, and memory 23 for storage of information (storage unit). The interface 19 can include computer network interfaces such as network cards, telephone communication processing boards, a combination of these or another interface configuration as would occur to those skilled in the art. Processor 21 may be comprised of one or more components configured as a single unit. For a multi-component form of processor 21, one or more components can be located remotely relative to the others. One or more components of processor 21 may be of the electronic variety defining digital circuitry, analog circuitry, or both. Memory 23 can include one or more types of solid-state electronic memory, magnetic memory, or optical memory, just to name a few. By way of nonlimiting example, memory 23 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 23 may be volatile, nonvolatile, or a hybrid combination of volatile and nonvolatile varieties.

The customer processing system 18 can be integrated within server 16 or can be located on a separate server, which communicates with server 16. As to the interface with PSTN 28, customer processing system 18 may be configured to operate in the form of a Private Branch Exchange (PBX), an ACD system, a combination of these, or another switching configuration as would occur to those skilled in the art. In one embodiment, the customer processing system is an ACD system provided on a computer, which is separate from server 16. In addition, the customer processing system 18 can be connected to the network 12 through server 16 and/or can be directly connected to the network 12. The agent station 20 can include an agent computer 22, a telephone 24, and other types of devices generally known to those skilled in the art. The agent station can be directly connected to the customer processing system 18 or can be indirectly connected to the customer processing system through a LAN 26, the network 12, a public switched telephone network (PSTN) 28, and in other manners generally known to those skilled in the art. It should be understood that while only one customer site 11 is depicted, two or more customer sites 11 can be coupled to center 14 through network 12 and/or PSTN 28.

The customer processing system 18 can route telephone calls, email, voice mail, internet chatting, and other forms of communication between agents and customers. For example, using telephone 13 a customer can communicate with an agent through the PSTN 28. In addition, a customer can communicate through the network 12 with an agent by using the computer 10 which is located at the customer site that is remote from the customer processing center 14. The customer can send an email, chat with an agent, and communicate by voice over the network 12 (VON). Furthermore, the customer at the customer site 11 can view web pages of the organization from the server 16. The customer processing system 18 packages these different forms of communication into one coherent communication system. The customer processing system 18 through processing these forms of communication can track a particular status of an agent. It is contemplated that the customer processing system 18 of the present invention can process different combinations of these and other forms of communication generally known to those skilled in the art.

An example of a customer interface will now be described below. The present invention is not intended to be limited to the interface described below and shown in the drawings. Other types of interfaces generally known to those skilled in the art are also contemplated to be incorporated into the present invention. When a customer wants to check the status of a particular agent or group of agents, the customer can communicate with the customer processing system 18 by using the customer computer 10 which is connected to network 12. In one embodiment, the customer uses a web browser to communicate information over the internet with the customer contact processing center 14. The customer first selects a URL on a web page to view the status of an agent. The customer then can be prompted to enter user information through a new user login form 30, as shown in FIG. 2. This login form 30 is optional; however, the form 30 can be used to improve security and enhance customer service by supplying customer information to the customer processing system 18. The login form 30 can request the name of the customer, company, telephone number, fax number, email address, and other information which may be helpful to an agent or the organization in general. As will be described below, this information can be used to alert an agent that a particular customer wishes to communicate with the agent. In addition, either the customer or the organization can supply the customer with an account name and password to improve the security of the system. This customer information can be collected, stored in a database, and used by the organization to improve relations between the customer and the organization as generally known to those skilled in the art. In one form, once the new customer user account is created, selected information can be sent to the web browser on the customer computer 10 so that the customer does not have to manually login again. Such information is sometimes called a "cookie."

After the customer logs into the system, an agent status search form 36 will appear on the customer computer 10. The customer can use the search form 36 to select specific criteria in order to check the status for the selected agents. The customer can search for the status of the agents by their first name, last name, department, location, specialty, a combination of these, or other manners generally known to those skilled in the art. For example, a customer can search for a particular agent by entering the last name of an agent into the appropriate field and submitting the search form 36. A customer can also search for the individual status of agents in a particular department or a particular physical location by entering criteria into the appropriate field on the search form 36.

After the search criteria of the customer is entered into the agent status search form 36, an agent status report 40, which is shown in FIG. 4, will appear on the customer computer 10. The agent status report 40 displays the current status of the selected agent submitted in the agent status search form 36. It is also contemplated that the status of the agents in the entire organization could be displayed. The agent status report can include a name of agent field 42, and a status of agent field 44. The status of the agent field 44 can include statuses such as "Available", "Not Available", "Out To Lunch", "Out Of The Office", "In A Meeting", "In Training", "On Vacation", "At Home", "On The Phone", and any other status generally known to those skilled in the art. In comparison to systems in which only the wait time is given, the status of the agent field 44 provides the customer with more useful information. The agent status report 40 can also display a graphic 46 that shows the status of the agent. Since the customer does not have to read any words, the graphic 46 quickly alerts the customer of the status of the agent. In addition, the agent status report 40 can include an agent information field 48 which can display information such as the telephone number of the agent, the department of the agent, and the address of the agent. The report 40 can further include communication option fields 50 through which the customer can initiate contact with a particular agent. For example, the customer can select a URL containing an email address of the agent so that the customer can send the agent an email. Further, the customer can select a call-back feature in which the agent will call-back the customer. The customer can also use VON to communicate with the agent over the network 12. Other types of communication options 50 generally known to those skilled in the art are also contemplated to be included in the present invention.

Figure 5:
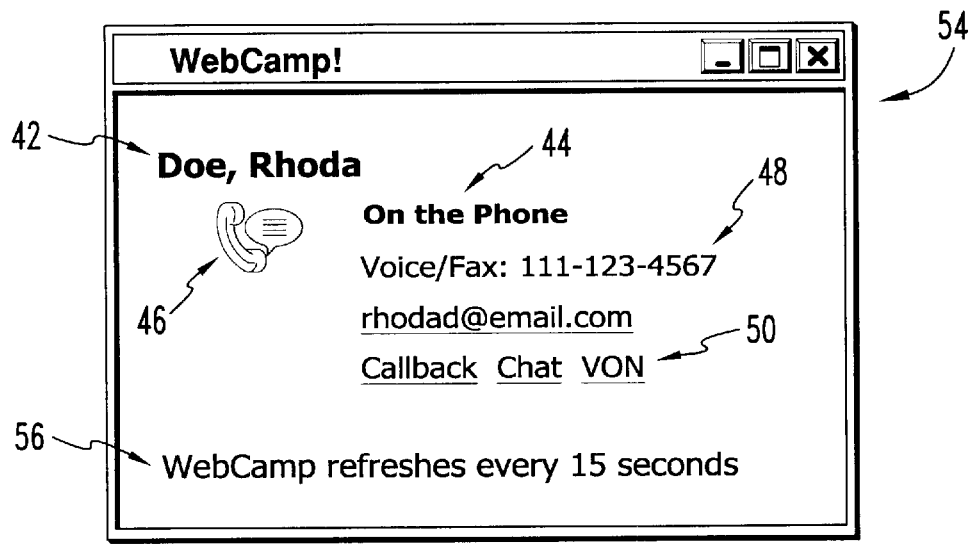
FIG. 5 shows a camping display screen for the system of FIG. 1.

If the customer wants to be constantly updated with the status of a particular agent, the customer can select a camping command 52 ("WEB CAMP™"). For example, if the status 44 of the agent is "On The Phone", the customer can select the camping command 52 so that the customer is constantly alerted of any changes in the status 44 of the agent. The camping command 52 can be a URL that generates a camping window 54, as shown in FIG. 5. The camping window 54 can display fields 42, 44, 46, 48 and 50 as described above for a single agent or multiple agents. It is contemplated that the camping window 54 can display additional information. The camping window 54 can include an information update field 56 that displays how often the information in the camping window 54 is updated. Either the customer or organization can set-up the duration in which the camping window 54 automatically refreshes itself. The customer can select the update rate so that the network traffic to the customer computer 10 is minimized. In one embodiment, the organization sets the update rate for the camping window in order to optimize the operating efficiency of the server 16 and the customer processing system 18. Further, in another embodiment, the camping window 54 is automatically updated every 15 seconds. Although the camping window 54 in FIG. 5 shows only the status of one agent, it is contemplated that the camping window 54 can include the status of multiple agents.

Figure 6:
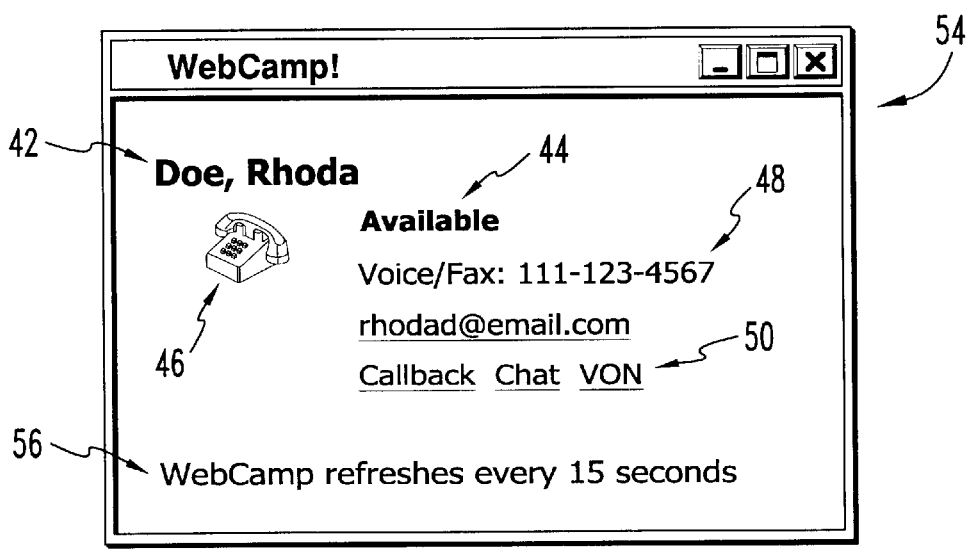
FIG. 6 shows an updated camping display screen for the system of FIG. 1.

The customer can browse other web pages and run other programs while the camping window 54 is displayed. This gives customers the ability to more efficiently utilize their time while waiting for selected agents to become available. In one form of the invention, the camping window 54 can be minimized to occupy only a portion of the customer's display screen when the agent is not available, and can maximize itself once the agent becomes available, thus providing a visual indication of a change in agent availability. As shown in FIGS. 5–6, the status field 44 and graphic 46 changes when the status of the agent changes. For example, once the camping window 54 displays that the selected agent is available, the customer can choose the various displayed communication options 50 or can call the agent using the customer telephone 13. In addition, the customer has the option of communicating with the selected agent at that time. This provides the customer with needed flexibility in scheduling. Since the customer can view the particular status of a selected customer, the customer is provided with a greater amount of information which can reduce the frustration associated with contacting agents and allows the customer to have greater flexibility in contacting the agents. In addition, since the status of the agent is automatically updated, the customer does not have to constantly waste time checking the status of the selected agent.

As mentioned above, the camping window 54 gives the customer the opportunity to communicate with the selected agent using different communication options 50 at anytime. For example, as shown in FIG. 5, the agent has a status 44 of "On the Phone". The customer by knowing that the agent is on the phone can still initiate one of the options 50 such as chatting with the agent. If the status 44 of the agent was "Out to Lunch", however, then the customer could choose a different communication option 50 which would be better suited to the particular situation, such as call back or email. In addition, the camping window 54 gives the customer a sense of security that the call from the customer is not being ignored. For example, if a customer left a voice mail message with a particular agent and has not yet received a reply, the customer can check the status of the selected agent and find out that the agent is in a meeting and cannot immediately return the call. Since the updating feature of the camping window 54 does not require additional input from the customer, the customer is free to run other programs and view other additional information such as web pages containing advertisements while being still informed of the status of an agent.

Figure 7:
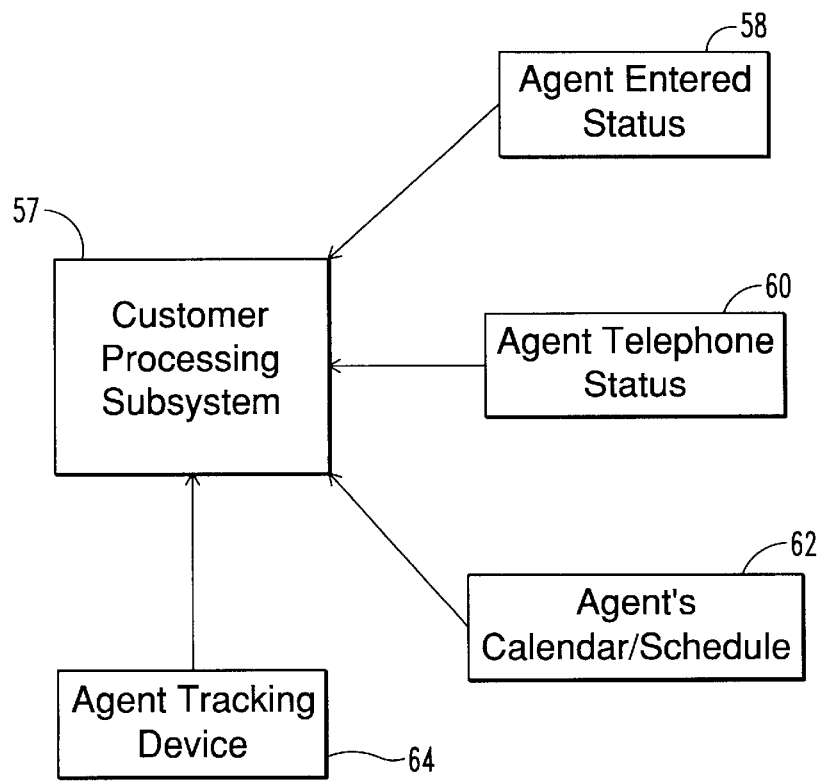
FIG. 7 is a diagrammatic view of a customer processing subsystem for the system of FIG. 1.
Figure 8:
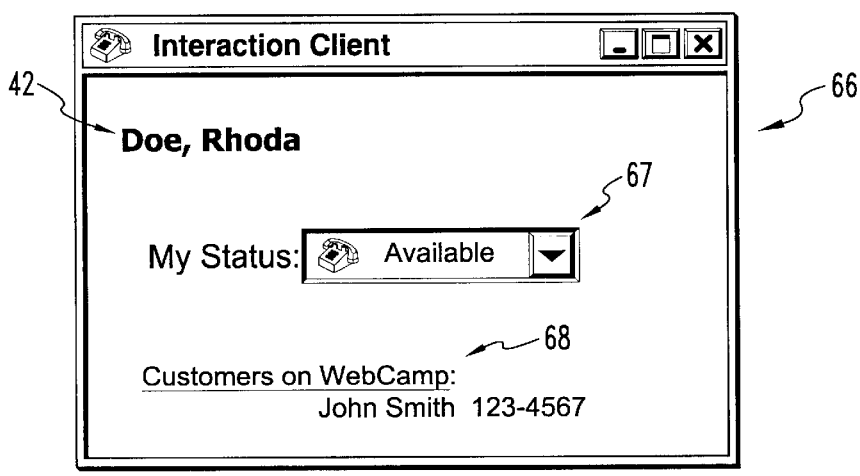
FIG. 8 shows an agent entered status display screen for the system of FIG. 1.

FIG. 7, shows a subsystem 57 of the customer processing system 18. The customer processing subsystem 57 receives and processes the status of each agent at a customer processing center 14. The customer processing subsystem 57 can receive information from an agent entered status 58 entered at the individual agent station 20, agent telephone status 60, calendar/schedule of the agent 62, and an agent tracking device 64. The agent entered status 58 can be entered by the agent through the computer 22 or the telephone 24 of the agent. For example, the telephone 24 of the agent can include buttons to indicate the present status of the agent. The agent can also enter the status through the telephone 24 by using a menu system provided by the customer processing system 18. In a preferred form, the status of the agent is entered by the agent through a customer processing system client screen 66, which is shown in FIG. 8. The agent client screen 66 can include the name of the agent field 42 and a status field 67. The status of the agent can be entered in the status field 67.

As shown in FIG. 7, the customer processing subsystem 57 constantly monitors the status of the telephone 24 of the agent. Further, the customer processing subsystem 57 can monitor the electronic calendar or schedule of the agent in order to check if the agent, for example, is on vacation or has some other status. The agent tracking device 64 can be used to track the location of the agent within or outside the customer contact processing center 14. For example, the agent tracking device can be attached to the clothing of the agent and monitored electronically throughout the customer contact processing center 14 as generally known to those skilled in the art. In addition, the status of the agent can be determined by using other ways, such as the customer processing subsystem 57 can receive data from an automated time card system to determine if the selected agent has "punched out" for the day.

In addition, as shown in FIG. 8, the agent form 66 can include a camping alert 68. The customer processing system 18 sends the camping alert 68 when a customers camps on a selected agent. The camping alert 68 notifies the selected agent that a customer is monitoring the status of the selected agent. The camping alert 66 can include additional customer information such as the information solicited on the new user login form 30 as described above. The camping alert 68 gives the agent the ability to terminate a communication early in order to communicate with an important customer. For example, the agent could be making a personal call when the agent receives the camping alert 68, the agent can terminate the personal call and immediately contact the customer. The camping alert field 68 can display multiple customers camping on a particular agent. This gives the agent the ability to prioritize and plan their communication with the customers. It is contemplated that other types of alerts, which are generally known to those skilled in the art, can be used as camping alerts.

Figure 9:
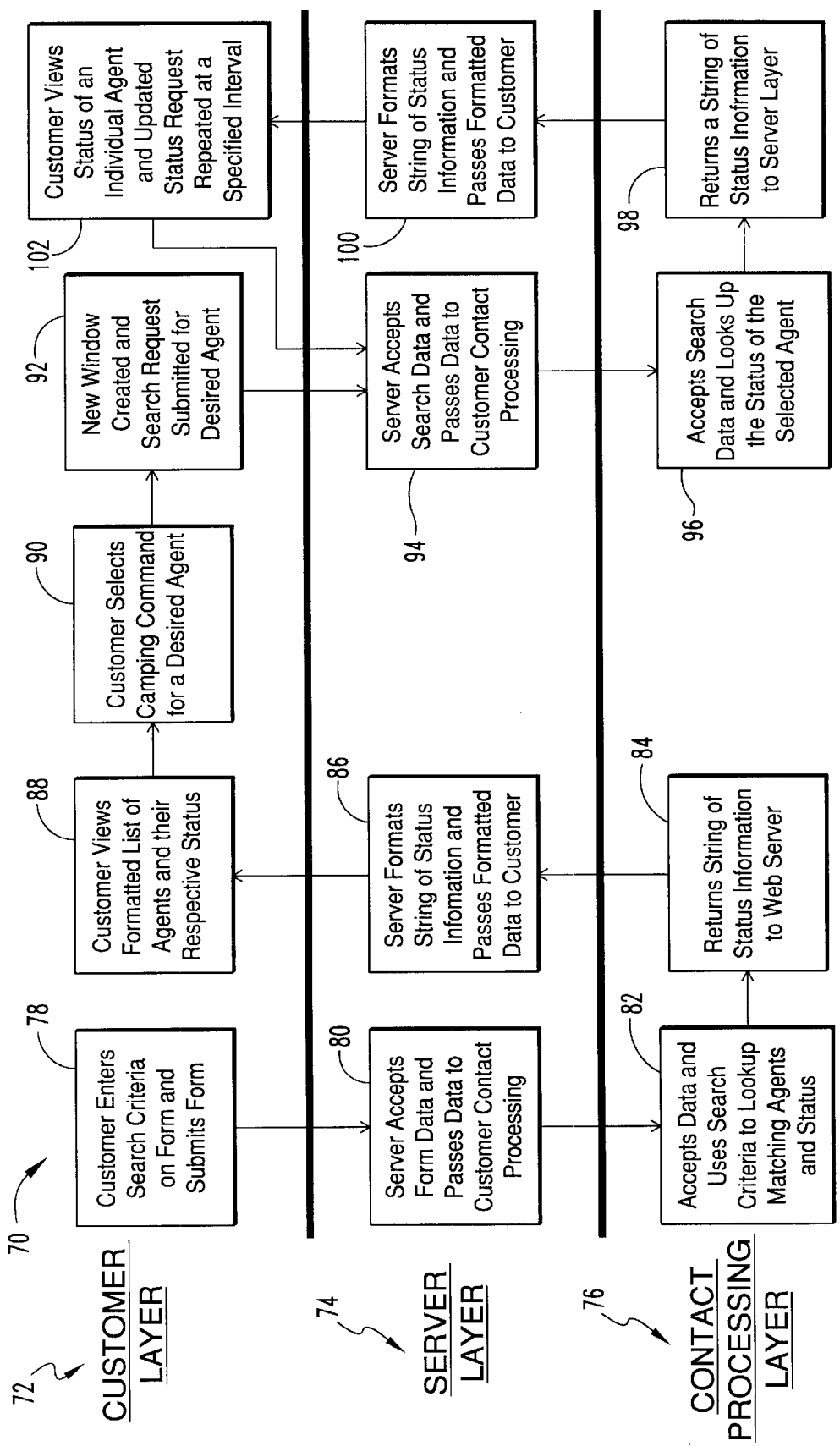
FIG. 9 is a flow diagram illustrating one process of displaying an updated status of an agent.

Referring now to FIG. 9, a flow diagram is shown that describes one process 70 for updating agent status with system 5. It is contemplated that other ways of achieving the desired results are considered to be incorporated into the present invention. The customer layer 72 corresponds to the customer computer 10. The server layer 74 corresponds to the processes occurring on the server 16, and the contact processing layer 76 corresponds to the processes occurring on the customer processing system 18. As discussed above, the server 16 and the customer processing system 18 can be combined so that the server layer 74 and the contact processing layer 76 become one layer. The stages executed on the customer layer 72 can be executed by using a web browser and other types of client software generally known by those skilled in the art. The stages executed on the server layer 74 can be executed by a typical web server as generally known to those skilled in the art. For example, the stages on the server layer 74 can be performed by common gateway interface (CGI) executables, active server pages (ASP), and in other manners generally known to those skilled in the art. The stages executed within the contact processing layer 76 can be executed by an ACD system generally known by those skilled in the art.

The flow chart shows the stages after the customer logs into the system. In stage 78, the customer enters the search criteria and submits the agent status search form 36 as shown in FIG. 3. The server 16 in stage 80 accepts the data from the form and passes the data to the customer contact processing layer 76. In stage 82, t he customer processing system 18 accepts data and uses the search criteria to look up matching agents and their respective status. In stage 84, the contact processing layer 76 returns a string of status information to the server layer 74. The server layer 74 in stage 86 formats the string of status information and passes the formatted data to the customer layer 72. In one embodiment, in stage 86 the server layer 74 formats the data into a hypertext mark-up language (HTML) file and transfers it to the computer 10 of the customer. The customer in stage 88 views the formatted list of agents and their respective status. One example of such a list is the agent status report 40 shown in FIG. 4.

In stage 90, a customer selects a camping option for a desired party. A new window is created and a search request is submitted to the server layer 74 for a desired agent in stage 92. The server layer 74 accepts the search data in stage 94 and passes the data to the customer contact processing layer 76. The customer contact processing layer 76 in stage 96 accepts the search data and uses it to look up the status of the selected agent. At this time or at another time, the customer contact processing layer can send the camping alert 68 to the agent station 20. The contact processing layer 76 in stage 98 returns a string of status information to the server layer 74. In stage 100, the server layer 74 formats the string of status information and passes the formatted data to the customer (such as an HTML file as described above). In stage 102, the customer views the status of the selected agent in the new window. An updated status request is automatically sent from time to time back to the server layer 74 and the cycle from stages 94 to 102 is repeated until the window is closed. In stage 102, the customer is shown the camping window 54 as shown in FIGS. 5–6.

In an alternative form, if a communication program in the server layer 74 that communicates with the contact processing layer 76 is unable to format the string of status information in stages 86 and 100, the communication program can forward the string of status information to a formatting program that will format the status information. Alternatively, the communication program can send the unformatted string of status information to the customer layer 72 which in turn immediately sends the string of status information to the formatting program for formatting.

A computer readable device such as memory 23 can be encoded with instructions so that the above described process 70 can be executed by the central processing system 18. In one form, the computer readable device is a computer storage disk. However, it is contemplated that the computer readable device can alternatively or additionally include other devices generally know by those skilled in the art that can be read by a computer.

While a specific embodiment of the present invention has been shown and described in detail, the breadth and scope of the present invention should not be limited by the above described exemplary embodiment, but should be defined only in accordance with the following claims and their equivalents. All changes and modifications that come within the spirit of the invention are desired to be protected.

What is claimed is:

1. A method, comprising:
   operating a first computer configured to store a status indication for each of a number of different agents at a customer contact processing center, the first computer being coupled to a second computer by a computer network, the second computer being remotely located relative to the first computer at a customer site;
   receiving from the second computer an input corresponding to a selection of at least one of the agents by a customer at the customer site;
   providing the status indication for the at least one of the agents from the first computer to the second computer; and
   automatically updating the status indication provided to the second computer for the at least one of the agents from time to time in response to said receiving.

2. The method of claim 1, further comprising changing the status indication during said automatically updating.

3. The method of claim 2, further comprising establishing communication between the at least one of the agents and a customer in response to said changing the status indication.

4. The method of claim 1, further comprising providing the customer a listing of the agents from which to make the selection.

5. The method of claim 4, further comprising searching by the customer for the at least one of the agents from the listing before making the selection.

6. The method of claim 1, wherein said providing includes displaying a web page that contains the status indication for the at least one of the agents on the second computer while permitting the customer to view other web pages on the computer network, and the computer network includes the internet.

7. The method of claim 1, further comprising notifying the at least one of the agents that the customer is receiving the status indication.

8. The method of claim 1, further comprising changing the rate of said automatically updating.

9. The method of claim 1, further comprising setting a rate for said automatically updating.

10. The method of claim 1, wherein the status indication indicates that the at least one of the agents is communicating over a first medium, and further comprising initiating communication with the at least one of the agents over a second medium.

11. The method of claim 1, further comprising maintaining a list of customers permitted access to the status indication of the agents.

12. The method of claim 1, further comprising:
   receiving an agent-selected status from each of the number of different agents;
   monitoring a phone line status of each of the number of different agents; and
   determining the status indication for each of the number of different agents from the agent-selected status and the phone line status.

13. The method of claim 1, wherein the status indication relates to agent availability.

14. The method of claim 1, wherein the status indication relates to at least one of agent on phone, agent in a meeting, or agent out of office.

15. The method of claim 1, further comprising:
   changing the status indication during said automatically updating;
   establishing communication between the at least one of the agents and a customer in response to said changing; and
   wherein said providing includes displaying a web page that contains the status indication for the at least one of the agents on the second computer while permitting the customer to view other web pages on the computer-network, and the computer network includes the internet.

16. A system, comprising:
   a customer computer;
   a computer network;
   a customer contact processing computer coupled to said customer computer by said computer network, said customer contact processing computer including a storage unit to store a status indication for individual agents, said customer contact processing computer being responsive to an input from said customer computer over said computer network corresponding to a selection of at least one of said agents by a customer operating said customer computer to transmit over said computer network said status indication for said at least one of said agents from said storage unit to said customer computer; and
   wherein said customer contact processing computer automatically updates said status indication transmitted to said customer computer for said at least one of said agents from time to time.

17. The system of claim 16, wherein said computer network includes a local area network.

18. The system of claim 17, wherein said computer network includes the internet.

19. The apparatus of claim 16, wherein said customer contact processing computer enables communication between said at least one of said agents and said customer.

20. The apparatus of claim 16, wherein said customer contact processing computer notifies said at least one of said agents that said customer is receiving said indicated status.

21. The apparatus of claim 16, wherein said customer contact processing computer maintains a list of customers permitted access to said status indication of said agents.

22. The apparatus of claim 16, wherein said customer contact processing computer receives an agent-selected status from each of said number of different agents, monitors a phone line status of each of said number of different agents, and determines said status indication for each of said number of different agents from said agent-selected status and said phone line status.

23. An apparatus, comprising:

means for storing the status indication for each of a number of different agents at a customer contact processing center;

means for receiving across a computer network an input corresponding to a selection of at least one of said agents by a customer from a computer remotely located at a customer site;

means for providing said status indication for said at least one of said agents from said means for storing to said computer located at said customer site; and means for automatically updating said status indication provided to said second computer for said at least one of said agents from time to time.

24. The apparatus of claim 23, further comprising:

means for receiving an agent-selected status from each of said number of different agents;

means for monitoring a phone line status of each of said number of different agents;

means for determining said status indication for each said number of different agents from said agent-selected status and said phone line status; and means for maintaining a list of customers permitted access to said status indication of said agents.

25. The apparatus of claim 23, further comprising:

means for enabling communication between said at least one of said agents and said customer;

means for displaying a web page that contains said status indication for said at least one of said agents on said second computer while permitting said customer to view other web pages on said computer network; and means for notifying said at least one of said agents that said customer is receiving said indicated status.

26. An apparatus, comprising:

a computer readable device encoded with a program executable by a first computer for a customer contact processing center which communicates over a computer network to maintain a status indication for each of a number of different agents at the customer contact processing center and receive over said computer network an input corresponding to a selection of at least one of said agents by a customer on a second computer located at a remote customer site, said program being further executable by said first computer to provide over said computer network said status indication for said at least one of said agents to said second computer in response to said selection; and wherein said program is further executable by said first computer to automatically update said status indication provided to said second computer for said at least one of said agents from time to time.

27. The apparatus of claim 26, wherein said program is further executable by said first computer to notify said at least one of said agents that said customer is receiving said status indication.

28. The apparatus of claim 26, wherein said program is further executable by said first computer to enable communication between said agents and said customer.

29. The apparatus of claim 26, wherein said program is further executable by said first computer to maintain a list of customers permitted access to said status indication of said agents.

* * * * *